United States Patent
Dellock et al.

(10) Patent No.: US 9,539,937 B2
(45) Date of Patent: Jan. 10, 2017

(54) VEHICLE STEP LAMP

(71) Applicant: Ford Global Technologies, LLC, Dearborn, MI (US)

(72) Inventors: Paul Kenneth Dellock, Northville, MI (US); Travis S. Garland, Milford, MI (US); Michael Musleh, Canton, MI (US); Stuart C. Salter, White Lake, MI (US); Harry Lobo, Canton, MI (US); Kevin M. O'Callaghan, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 14/639,326

(22) Filed: Mar. 5, 2015

(65) Prior Publication Data

US 2015/0175059 A1 Jun. 25, 2015

Related U.S. Application Data

(63) Continuation-in-part of application No. 14/086,442, filed on Nov. 21, 2013.

(51) Int. Cl.
*B60Q 1/32* (2006.01)
*F21S 8/10* (2006.01)

(52) U.S. Cl.
CPC ............. *B60Q 1/323* (2013.01); *F21S 48/214* (2013.01)

(58) Field of Classification Search
None
See application file for complete search history.

(56) References Cited

U.S. PATENT DOCUMENTS

| | | | |
|---|---|---|---|
| 1,439,210 A * | 12/1922 | Webster | B60Q 1/323 362/495 |
| 5,915,830 A | 6/1999 | Dickson et al. | |
| 6,244,734 B1 | 6/2001 | Hulse | |
| 6,382,819 B1 * | 5/2002 | McQuiston | B60R 3/002 362/487 |
| 6,513,821 B1 | 2/2003 | Heil | |
| 6,588,782 B2 | 7/2003 | Coomber et al. | |
| 6,641,290 B2 * | 11/2003 | Ishiharada | B60K 37/02 362/495 |
| 6,709,137 B1 * | 3/2004 | Glovak | B60Q 1/323 362/495 |
| 6,729,738 B2 | 5/2004 | Fuwausa et al. | |
| 6,773,129 B2 | 8/2004 | Anderson, Jr. et al. | |
| 6,871,986 B2 | 3/2005 | Yamanaka et al. | |
| 6,990,922 B2 | 1/2006 | Ichikawa et al. | |

(Continued)

FOREIGN PATENT DOCUMENTS

CN 201169230 Y 12/2008
CN 201193011 Y 2/2009

(Continued)

*Primary Examiner* — Britt D Hanley
(74) *Attorney, Agent, or Firm* — Jason Rogers; Price Heneveld LLP

(57) ABSTRACT

An illumination apparatus for a vehicle is disclosed. The illumination apparatus comprise a light source disposed on a step portion. A first coating layer is molded over the step portion and the light source. A photoluminescent portion is disposed proximate a tread portion of the step portion. The light source is configured to emit a first emission to excite the photoluminescent portion to emit a second emission.

19 Claims, 6 Drawing Sheets

(56) References Cited

U.S. PATENT DOCUMENTS

| | | | |
|---|---|---|---|
| 7,213,923 B2 | 5/2007 | Liu et al. | |
| 7,264,366 B2 | 9/2007 | Hulse | |
| 7,264,367 B2 | 9/2007 | Hulse | |
| 7,621,546 B2* | 11/2009 | Ross | B60R 3/02 280/163 |
| 7,630,787 B2 | 12/2009 | MacDonald et al. | |
| 7,632,445 B2 | 12/2009 | Porter et al. | |
| 7,753,541 B2 | 7/2010 | Chen et al. | |
| 7,834,548 B2 | 11/2010 | Jousse et al. | |
| 7,896,374 B2 | 3/2011 | Kuntze et al. | |
| 8,016,465 B2 | 9/2011 | Egerer et al. | |
| 8,203,260 B2 | 6/2012 | Li et al. | |
| 8,408,766 B2 | 4/2013 | Wilson et al. | |
| 8,466,438 B2 | 6/2013 | Lambert et al. | |
| 8,519,362 B2 | 8/2013 | Labrot et al. | |
| 8,606,430 B2 | 12/2013 | Seder et al. | |
| 8,702,284 B2 | 4/2014 | Huang-Tsai | |
| 8,724,054 B2 | 5/2014 | Jones | |
| 8,773,012 B2 | 7/2014 | Ryu et al. | |
| 9,333,919 B2* | 5/2016 | Crandall | B60Q 1/323 |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2006/0249924 A1* | 11/2006 | Armstrong | B60R 3/002 280/163 |
| 2007/0097664 A1* | 5/2007 | Stokes | B60Q 3/0256 362/84 |
| 2007/0296175 A1* | 12/2007 | Flajnik | B60R 3/002 280/169 |
| 2009/0121449 A1* | 5/2009 | Kuntze | B60R 3/00 280/163 |
| 2009/0219730 A1 | 9/2009 | Syfert et al. | |
| 2010/0186214 A1* | 7/2010 | Judge | B60Q 1/2696 29/445 |
| 2010/0224799 A1* | 9/2010 | Kalish | B60Q 1/32 250/492.1 |
| 2012/0001406 A1 | 1/2012 | Paxton et al. | |
| 2013/0335994 A1 | 12/2013 | Mulder et al. | |
| 2014/0266666 A1 | 9/2014 | Habibi | |

FOREIGN PATENT DOCUMENTS

| | | |
|---|---|---|
| DE | 29708699 U1 | 7/1997 |
| DE | 10319396 A1 | 11/2004 |
| EP | 1192065 A1 | 4/2002 |
| EP | 1793261 A1 | 6/2007 |
| EP | 2778209 A1 | 9/2014 |
| GB | 2087299 A | 5/1982 |
| JP | 2000159011 A | 6/2000 |
| WO | 2006047306 A1 | 5/2006 |
| WO | 2014068440 A1 | 5/2014 |

* cited by examiner

VEHICLE STEP LAMP

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related application is hereby incorporated by reference in its entirety.

FIELD OF THE INVENTION

The present invention generally relates to vehicle lighting systems, and more particularly, to a lighting apparatus for a vehicle bin employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illumination apparatus for a vehicle is disclosed. The illumination apparatus comprise a light source disposed on a step portion. A first coating layer is molded over the step portion and the light source. A photoluminescent portion is disposed proximate a tread portion of the step portion. The light source is configured to emit a first emission to excite the photoluminescent portion to emit a second emission.

According to another aspect of the present invention, an illuminated running board for a vehicle is disclosed. The illuminated running board comprises a light source disposed on a step portion. A first coating layer is applied over the step portion and the light source. A second coating is disposed over the first coating. The second coating is applied to the first coating such that light energy corresponding to a first emission passes through at least one unmasked portion of the second coating to illuminate an outer surface of the second coating.

According to yet another aspect of the present invention, an illuminated running board for a vehicle is disclosed. The illuminated running board comprises a light source configured to output at a first emission and disposed on a step portion. A first coating layer is applied over the step portion and the light source. A second coating is selectively applied over the first coating to mask at least a portion of an outer surface of the first coating. A photoluminescent portion is disposed proximate an unmasked portion of the first coating. The first emission passes through the unmasked portion to illuminate an outer surface of the second coating.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure, which may be combined in various combinations and/or individually utilized in order to clearly reference various elements of the disclosure.

Vehicle steps or step portions, often referred to as running boards, may be utilized on vehicles to assist entering passengers. Though running boards are intended to assist passengers, they can sometimes be obscured due to dark ambient lighting conditions. In such conditions, a passenger may miss stepping on the step portion. The disclosure provides for a lighting apparatus configured to illuminate a portion of a running board. In this way, a step portion may be more visibly utilized, and may be illuminated to enhance the appearance of the vehicle.

Figure 1:
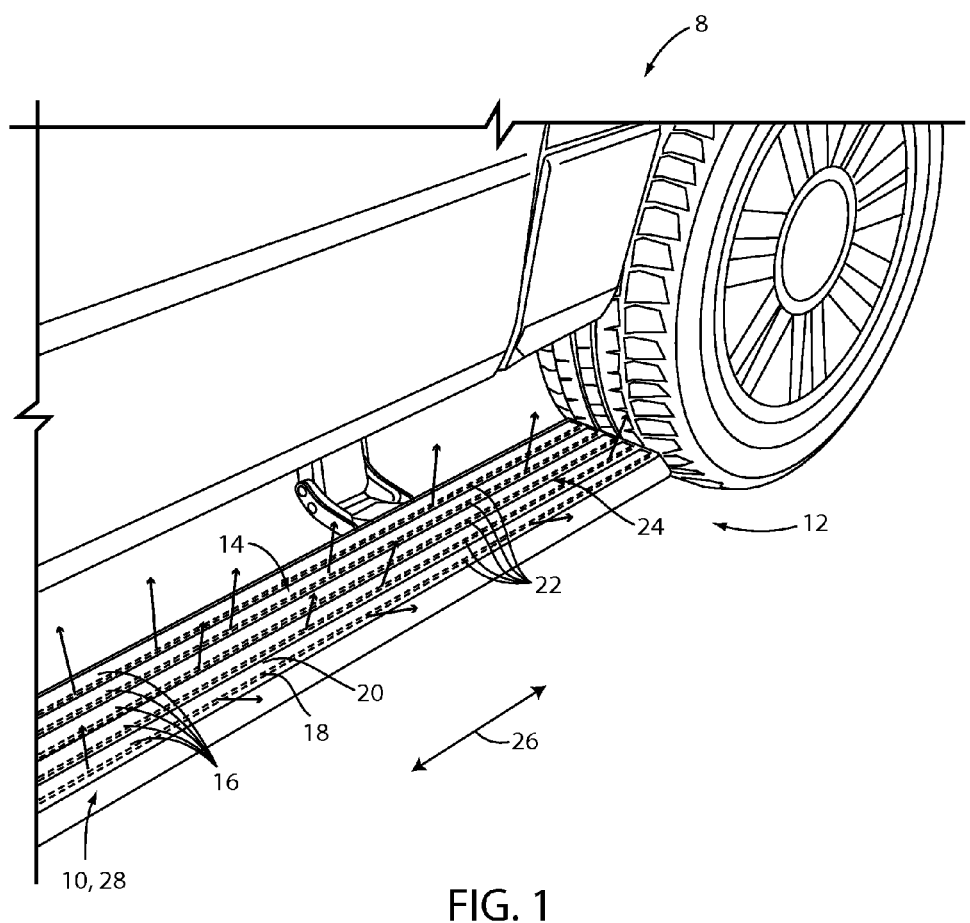
FIG. 1 is a perspective view of a step portion of a vehicle comprising an illumination apparatus.

Referring to FIG. 1, a perspective view of a vehicle 8 comprising a step portion 10 is shown. The step portion 10 may comprise a lighting apparatus 12. In various implementations, the lighting apparatus 12 may be operable to illuminate a step surface 14 proximate a tread portion 16 of the step portion 10. Some of the implementations discussed herein may utilize photoluminescent materials to illuminate at least a portion of the step surface 14. By illuminating at least a portion of the step surface 14, the disclosure may provide for an enhanced appearance of the vehicle 8 while also providing valuable safety features.

In order to illuminate the portion of the step surface 14, a light source may be disposed on the step portion 10. The light source may be disposed on an upper surface of the step portion 10 according to one embodiment. The light source may be covered by a first coating layer 18, which may correspond to an at least semi-transparent molded layer of polymeric material. Over the first coating layer 18, the step surface 14 may be applied as a second coating layer 20. The second coating layer 20 may be applied selectively to the first coating layer 18 such that at least one unmasked portion 22 of the first coating layer remains exposed to an environment of the vehicle 8. In this configuration, light energy or a first emission of light may be transmitted out through the at least one unmasked portion 22 to illuminate the step surface 14.

In an exemplary embodiment, the lighting apparatus 12 may further comprise a photoluminescent portion 24 disposed proximate the tread portion 16. In some implementations, the photoluminescent portion 24 may be disposed on a surface corresponding to the at least one unmasked portion 22 and/or dispersed in a material corresponding to the first coating layer 18 such that the photoluminescent portion 24 is illuminated in a back-lit configuration. The photoluminescent portion 24 may also be illuminated in a front-lit configuration, wherein the photoluminescent portion is disposed on at least a portion of the step surface 14 proximate the at least one unmasked portion 22. Such configurations are discussed in further detail in reference to FIGS. 3-5.

In each of the embodiments discussed herein, the unmasked portions 22 may correspond to regions of the step surface 14 that may be selectively illuminated. The unmasked portions 22 may extend significantly along a longitudinal dimension 26 of the vehicle 8 such that the step surface 14 may be significantly illuminated. In this configuration, the lighting apparatus 12 may provide for a running board 28 for a vehicle that is illuminated to provide attractive lighting to improve a visual appearance of the vehicle 8 as well as safety lighting to ensure safe entry into the vehicle 8.

In embodiments comprising the photoluminescent portion 24, the at least one light source may be in communication with a controller operable to selectively illuminate the light source. The light source may emit an excitation emission or a first emission directed toward the photoluminescent portion 24. The excitation emission may comprise a first wavelength of light energy which may be configured to correspond to an absorption range of a photoluminescent material of the photoluminescent portion 24. In response to receiving the excitation emission, the photoluminescent portion 24 may become excited and emit an output emission 30 or a second emission, having a second wavelength different than the first wavelength. In this way, the lighting apparatus may utilize one or more photoluminescent materials to generate a consistent ambient glow along a longitudinal dimension 26 of the running board 28. The output emission 30 is represented by lines in FIG. 1 extending approximately from the unmasked portion 22.

Various systems and devices in communication with the controller may be utilized to automatically or manually activate and/or adjust the light emitted as the first wavelength from the at least one light source. An intensity or illumination level of the light source may be adjusted in response to an ambient light condition, presence detection, or any form of sensory interface. The light source may also be illuminated selectively in response to various vehicle states. For example, the light source may be activated in response to an ignition event, a locking, unlocking actuation, a gear selection, emergency brake actuation, a proximity of a key fob, etc. In some implementations, the light source may also be configured to illuminate in response to a presence or proximity detection of a vehicle key or key fob, and/or a signal from a remote keyless entry device.

Figure 2A:
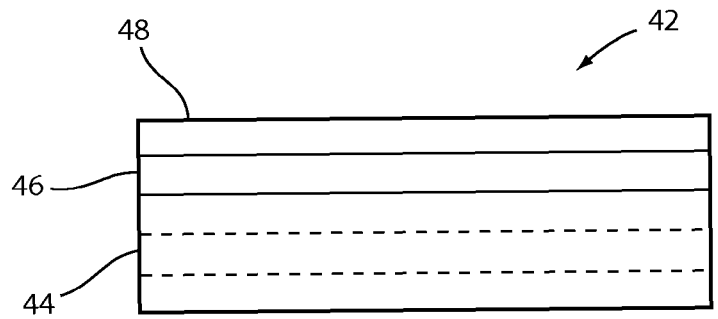
FIG. 2A illustrates a photoluminescent structure rendered as a coating.
Figure 2B:
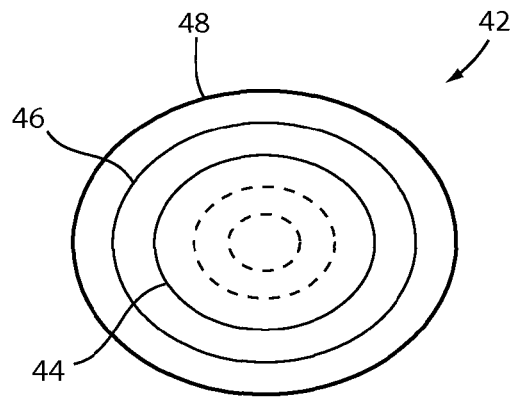
FIG. 2B illustrates the photoluminescent structure rendered as a discrete particle.
Figure 2C:
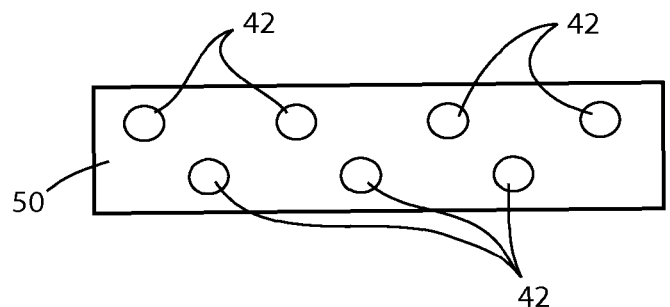
FIG. 2C illustrates a plurality of photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture or surface, a discrete particle capable of being implanted in a vehicle fixture, and a plurality of discrete particles incorporated into a separate structure capable of being applied to a vehicle fixture, respectively. The photoluminescent structure 42 may correspond to the photoluminescent portion 24 as discussed herein. At the most basic level, the photoluminescent structure 42 includes an energy conversion layer 44 that may be provided as a single layer or a multilayer structure, as shown through broken lines in FIGS. 2A and 2B. As discussed herein, a fixture may correspond to a surface material, panel, and/or any portion of the vehicle 8.

The energy conversion layer 44 may include one or more photoluminescent materials having energy converting elements selected from a phosphorescent and/or a fluorescent material. The photoluminescent material may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as a Stokes shift and serves as the principle driving mechanism for an energy conversion process corresponding to a change in wavelength of light, often referred to as down conversion. In the various implementations discussed herein, at least one of the wavelengths of light (e.g. the first wavelength, etc.) correspond to electromagnetic radiation utilized in the conversion process.

The photoluminescent portion may comprise at least one photoluminescent structure 42 comprising an energy conversion layer (e.g. energy conversion layer 44). The energy conversion layer 44 may be prepared by dispersing the photoluminescent material in a polymer matrix 50 to form a homogenous mixture using a variety of methods as shown in FIG. 2C. Such methods may include preparing the energy conversion layer 44 from a formulation in a liquid carrier medium and coating the energy conversion layer 44 to a desired planar and/or non-planar substrate of a vehicle fixture or surface. The energy conversion layer 44 coating may be deposited on a vehicle fixture or surface by painting, screen printing, spraying, slot coating, dip coating, roller coating, and bar coating. Additionally, the energy conversion layer 44 may be prepared by methods that do not utilize a liquid carrier medium.

For example, a solid state solution (e.g. a homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multilayered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multilayered energy conversion structure. For clarity, the polymer matrix 50 comprising photoluminescent material may be referred to as the energy conversion layer 44 hereinafter to demonstrate that each may be similarly utilized to convert the first wavelength of light to at least a second wavelength.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, and/or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture or surface.

In some implementations, the photoluminescent structure 42 may be incorporated into a vehicle fixture as one or more discrete particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
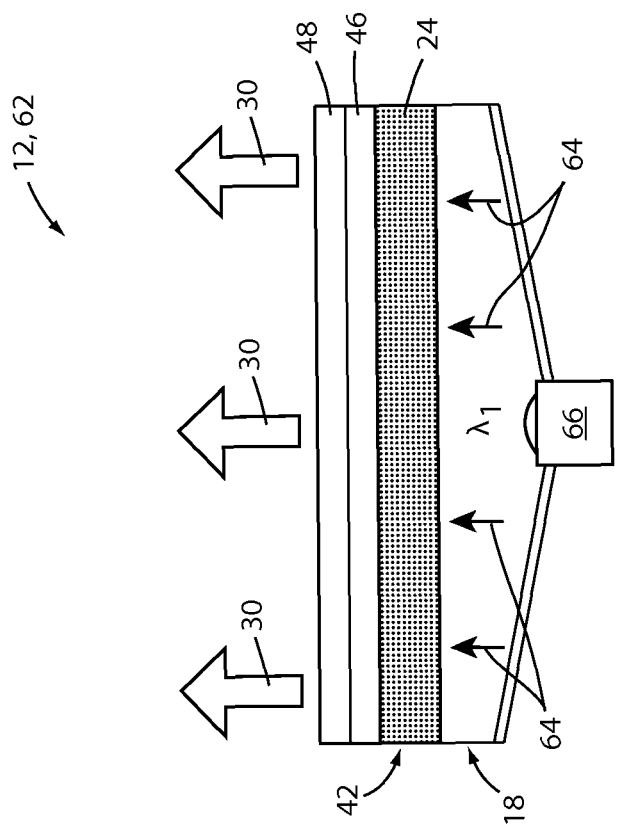
FIG. 3 is a schematic view of a front-lit configuration of a lighting apparatus configured to convert a first wavelength of light to at least a second wavelength.

Referring to FIG. 3, the lighting apparatus 12 is generally shown according to a back-lit configuration 62. The back-lit configuration 62 may demonstrate an exemplary implementation corresponding to the conversion of the excitation emission 64 from the at least one light source 66 to the output emission 30 as discussed in reference to FIG. 1. The output emission 30 may correspond to the light emitted from the photoluminescent portion 24. In this configuration, the excitation emission 64, emitted from the light source 66, is converted to the output emission 30 by the energy conversion layer 44 of the photoluminescent portion 24. A further detailed description corresponding to an exemplary implementation of the back-lit configuration 62 is discussed in reference to FIG. 5.

The excitation emission 64 comprises a first wavelength $\lambda_1$, and the output emission 30 comprises at least a second wavelength $\lambda_2$. The lighting apparatus 12 includes the photoluminescent structure 42 which may be rendered as a coating and applied to a substrate 68, panel, or surface of the vehicle 8, for example embedded or applied to the first coating layer 18. The photoluminescent material may also be dispersed in the polymer matrix 50 corresponding to the energy conversion layer 44 and utilized to form a portion of the first coating layer 18. In some implementations, the energy conversion layer 44 may further include the stability layer 46 and/or the protective layer 48.

In response to the at least one light source 66 being activated, the excitation emission 64 may be emitted from the first light source 66. In response to the excitation emission 64 or the first emission being received by the energy conversion layer 44, the photoluminescent portion 24 may convert the excitation emission 64 having the first wavelength $\lambda_1$ to the output emission 30 having the second wavelength $\lambda_2$. The output emission 30 may comprise a plurality of wavelengths configured to emit any color of light from the photoluminescent portion 24.

As discussed in reference to FIG. 1, in some embodiments, the light source 66 may output light as the excitation emission 64 directly to the outside environment without conversion by the photoluminescent portion 24. In such embodiments, the light source 66 may output different wavelengths of light that are configured to suit a desired color output from the unmasked portions 22 to illuminate the step surface 14 rather than targeting the absorption range of the energy conversion layer 44. This is due to there not being a Stokes shift that may significantly change the color from the excitation emission 64 to the output emission 30 in such implementations. For the purposes of this disclosure, embodiments described herein that are not discussed in reference to the photoluminescent portion 24 may output the emission from the light source 66 at wavelengths similar to those discussed in reference to the output emission 30.

In some implementations, the lighting apparatus 12 comprises at least one photoluminescent material incorporated in the energy conversion layer 44 and is configured to convert the excitation emission 64 at the first wavelength $\lambda_1$ to the output emission 30 having at least the second wavelength. In order to generate a plurality of wavelengths of the output emission 30, the energy conversion layer 44 may comprise a red-emitting photoluminescent material, a green-emitting photoluminescent material, and/or a blue-emitting photoluminescent material dispersed therein. The red, green, and blue-emitting photoluminescent materials may be combined to generate a wide variety of colors of light for the output emission 30.

Each of the photoluminescent materials may vary in output intensity, output wavelength, and peak absorption wavelengths based on a particular photochemical structure and combinations of photochemical structures utilized in the energy conversion layer 44. As an example, the output emission 30 may be changed by adjusting the wavelength of the excitation emission 64 to activate photoluminescent materials in the energy conversion layer 44 at different intensities to alter the color of the output emission 30. In addition to, or alternatively to the red, green, and blue-emitting photoluminescent materials, other photoluminescent materials may be utilized alone and in various combinations to generate the output emission 30 in a wide variety of colors. In this way, the lighting apparatus 12 may be configured for a variety of applications to provide a desired lighting effect for the vehicle 8.

The at least one light source 66 may also be referred to as an excitation source and is operable to emit at least the excitation emission 64. The light source 66 may comprise any form of light source 66, for example halogen lighting, fluorescent lighting, light emitting diodes (LEDs), organic LEDs (OLEDs), polymer LEDs (PLEDs), solid state lighting or any other form of lighting configured to output the excitation emission 64. The excitation emission 64 from the at least one light source 66 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may become excited and output the one or more output wavelengths corresponding to the output emission 30. The excitation emission 64 provides an excitation source for the energy conversion layer 44 by targeting absorption wavelengths of at least one of the various photoluminescent materials that may be utilized therein. As such, the lighting apparatus 12 may be configured to control the output emission 30 to generate a desired light intensity and color.

In an exemplary implementation, the light source 66 comprises at least one LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may comprise wavelengths in an ultraviolet or near ultraviolet color range (~250-450 nm). In an exemplary implementation, the first wavelength $\lambda_1$ may be approximately equal to 470 nm. In general, the first wavelength $\lambda_1$ may be approximately less than 500 nm such that the excitation emission 64 of the light is not significantly visible relative to the output emission 30.

Each emission color, wavelength or combination of wavelengths of each of the emissions may correspond to significantly different spectral color ranges. Some wavelengths may comprise a plurality of wavelengths that may correspond to the excitation of a red-emitting photoluminescent material having a wavelength of approximately 620-750 nm. Some wavelengths may correspond to the excitation of a green emitting photoluminescent material having a wavelength of approximately 526-606 nm. Some wavelengths may correspond to a blue or blue green emitting photo luminescent material having a wavelength longer than the first wavelength $\lambda_1$ and approximately 430-525 nm. The wavelengths may be utilized to generate a wide variety of colors of light emitted from the photoluminescent portion 24 and the second photoluminescent portion 32 and any other photoluminescent portions discussed herein.

Figure 4:
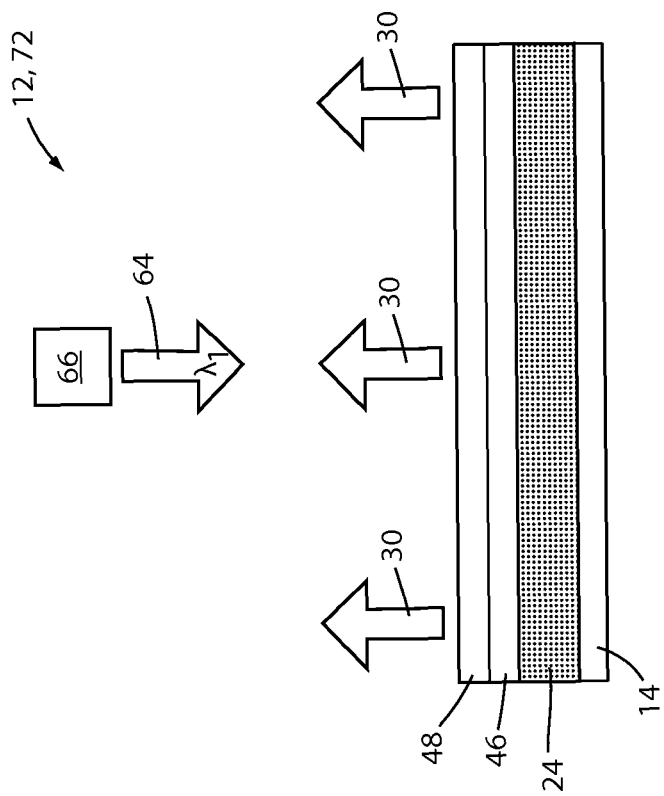
FIG. 4 is a schematic view of a back-lit configuration of a lighting apparatus configured to convert a first wavelength of light to at least a second wavelength.

Referring to FIG. 4, an implementation of the lighting apparatus 12 is generally shown according to a front-lit configuration 72. In this configuration, the photoluminescent portion 24 may be configured to convert the first wavelength $\lambda_1$ from the light source 66 to the output emission 30. The front-lit configuration 72 may differ from the back-lit configuration 62 in that the excitation emission 64 in the front-lit configuration is emitted from the at least one unmasked portion 22 such that the first wavelength $\lambda_1$ is converted to the second wavelength after being transmitted through and emitted from the unmasked portion 22. In this configuration, the photoluminescent portion 24 may be disposed on the step surface 14 such that the output emission 30 is emitted from the step surface 14.

Figure 5:
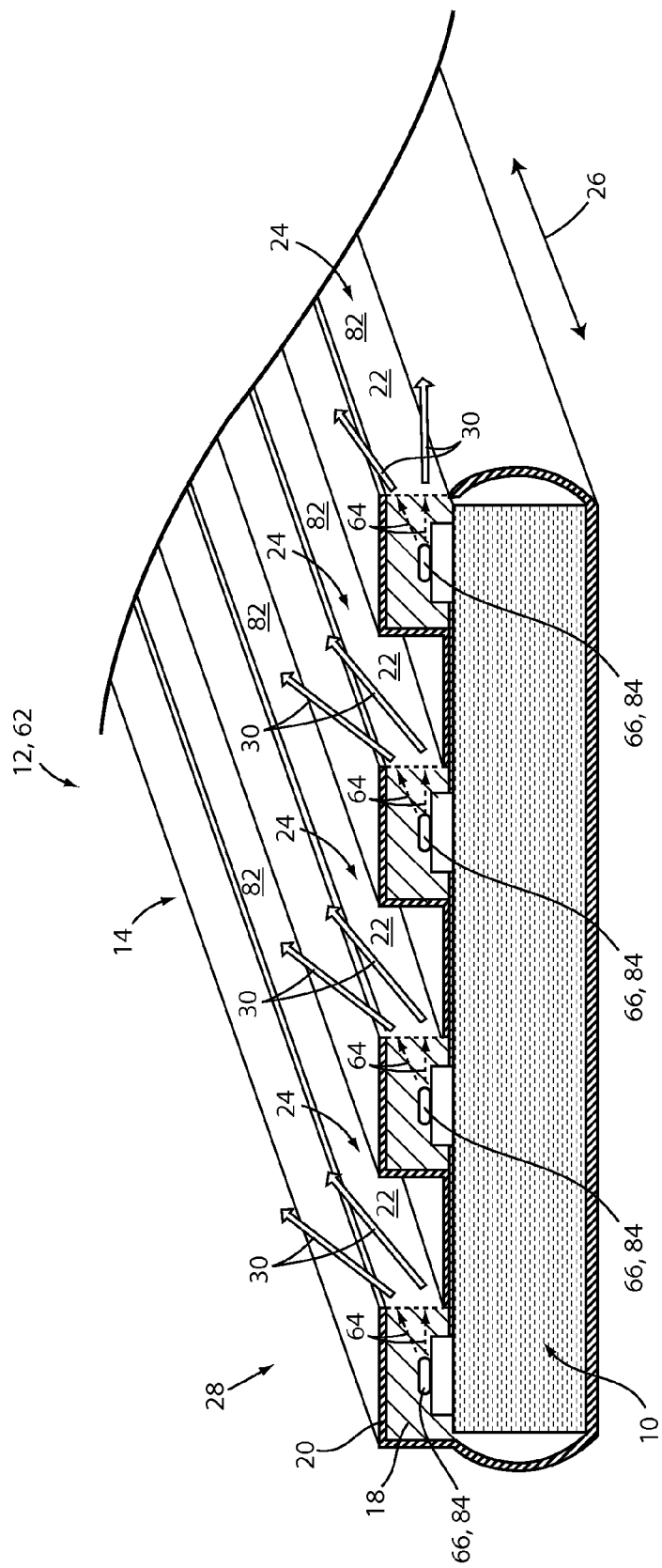
FIG. 5 is a perspective cross-sectional view of a step portion of a vehicle comprising a lighting apparatus.

Referring now to FIG. 5, a perspective cross-sectional view of the step portion 10 of running board 28 is shown demonstrating the lighting apparatus 12. The step portion 10 is shown having the first coating layer 18 and the second coating layer 20 disposed thereon. The photoluminescent portion 24 may correspond to a photoluminescent structure disposed on an outer surface 82 of the unmasked portion 22 and/or dispersed in the at least partially light transmissive material of the first coating layer 18. As illustrated in FIG. 5, the photoluminescent portion 24 is illuminated in a back-lit configuration 62.

The unmasked portions 22 may correspond to regions of the step surface 14 that may be selectively illuminated by a controller. The controller is further discussed in reference to FIG. 6. The unmasked portions 22 may extend significantly along a longitudinal dimension 26 of the vehicle 8 such that the step surface 14 may be significantly illuminated. The light source 66 may comprise a plurality of emitters 84 that may be evenly spaced along the longitudinal dimension 26 to substantially evenly illuminate the step surface 14. In this configuration, the lighting apparatus 12 may provide for a running board 28 for a vehicle that is illuminated to provide attractive lighting to improve a visual appearance of the vehicle 8 as well as to provide lighting to ensure safe entry into the vehicle 8.

In embodiments comprising the photoluminescent portion 24, the at least one light source 66 may be utilized to excite the material of the photoluminescent portion. The light source 66 may emit the excitation emission 64 toward the photoluminescent portion 24. In response to receiving the excitation emission 64, the photoluminescent portion 24 may become excited and emit an output emission 30 or a second emission, having a second wavelength different than the first wavelength. In this way, the lighting apparatus 12 may utilize one or more photoluminescent materials to generate a consistent ambient glow along a longitudinal dimension 26 of the running board 28.

Figure 6:
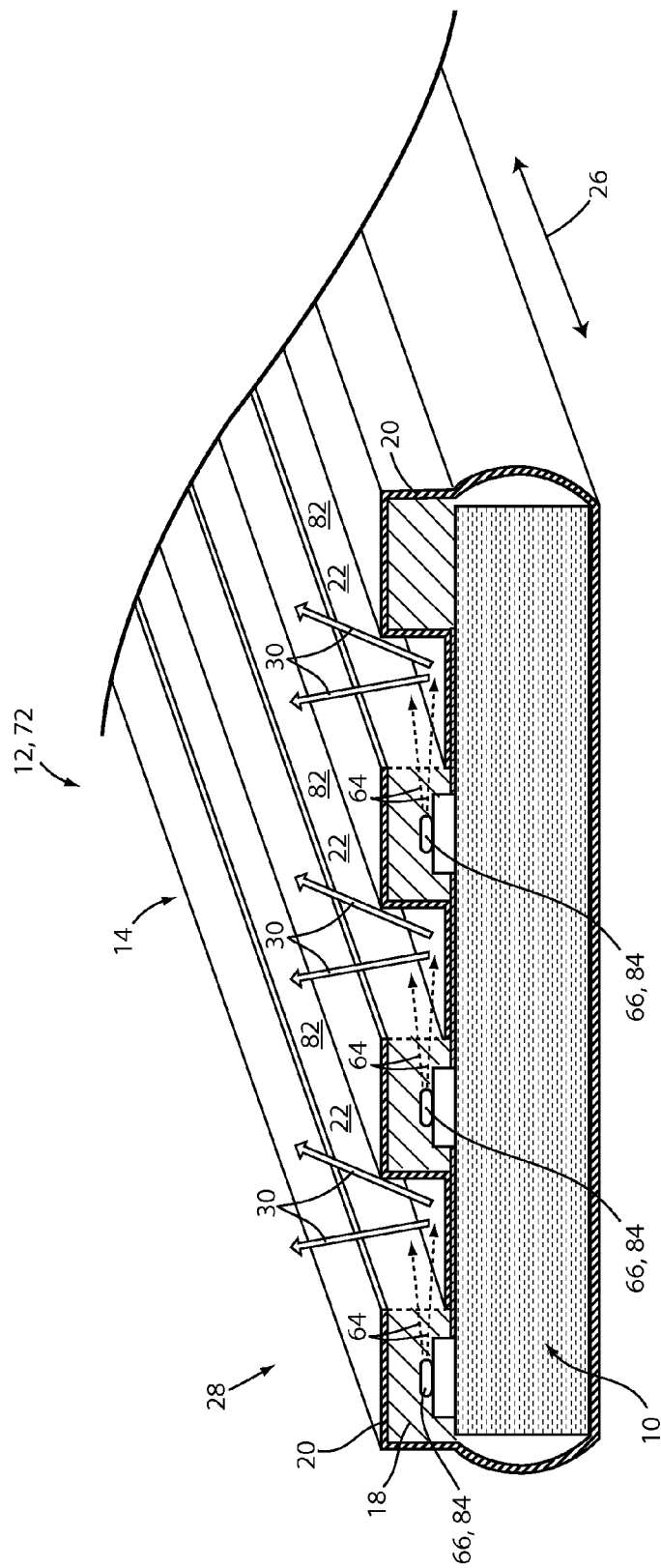
FIG. 6 is a perspective cross-sectional view of a step portion of a vehicle comprising a lighting apparatus.

Referring now FIG. 6, a perspective cross-sectional view of the step portion 10 of running board 28 is shown demonstrating the lighting apparatus 12. The step portion 10 is shown having the first coating layer 18 and the second coating layer 20 disposed thereon. The photoluminescent portion 24 may correspond to a photoluminescent structure disposed on the step surface 14 proximate the unmasked portion 22. In this configuration, the excitation emission 64 may be emitted outward from the outer surface 82 of the unmasked portion 22 to the photoluminescent portion disposed on the step surface 14. In response to receiving the excitation emission 64 or the first emission, the energy conversion layer 44 may become excited and output the output emission 30 or the second emission. As illustrated in FIG. 6, the photoluminescent portion 24 is illuminated in a front-lit configuration 72.

The unmasked portions 22 may correspond to regions of the step surface 14 that may emit the excitation emission 64 therefrom in response to an activation or control signal received from the controller. The unmasked portions 22 and the photoluminescent portions 24 may extend significantly along a longitudinal dimension 26 of the vehicle 8 such that the step surface 14 may be significantly illuminated. The light source 66 may comprise a plurality of emitters 84 that may be evenly spaced along the longitudinal dimension 26 to evenly illuminate the step surface 14. In this configuration, the lighting apparatus 12 may provide for a running board 28 for a vehicle that is illuminated to provide attractive lighting to improve a visual appearance of the vehicle 8 as well as safety lighting to help ensure safe entry into the vehicle 8.

Figure 7:
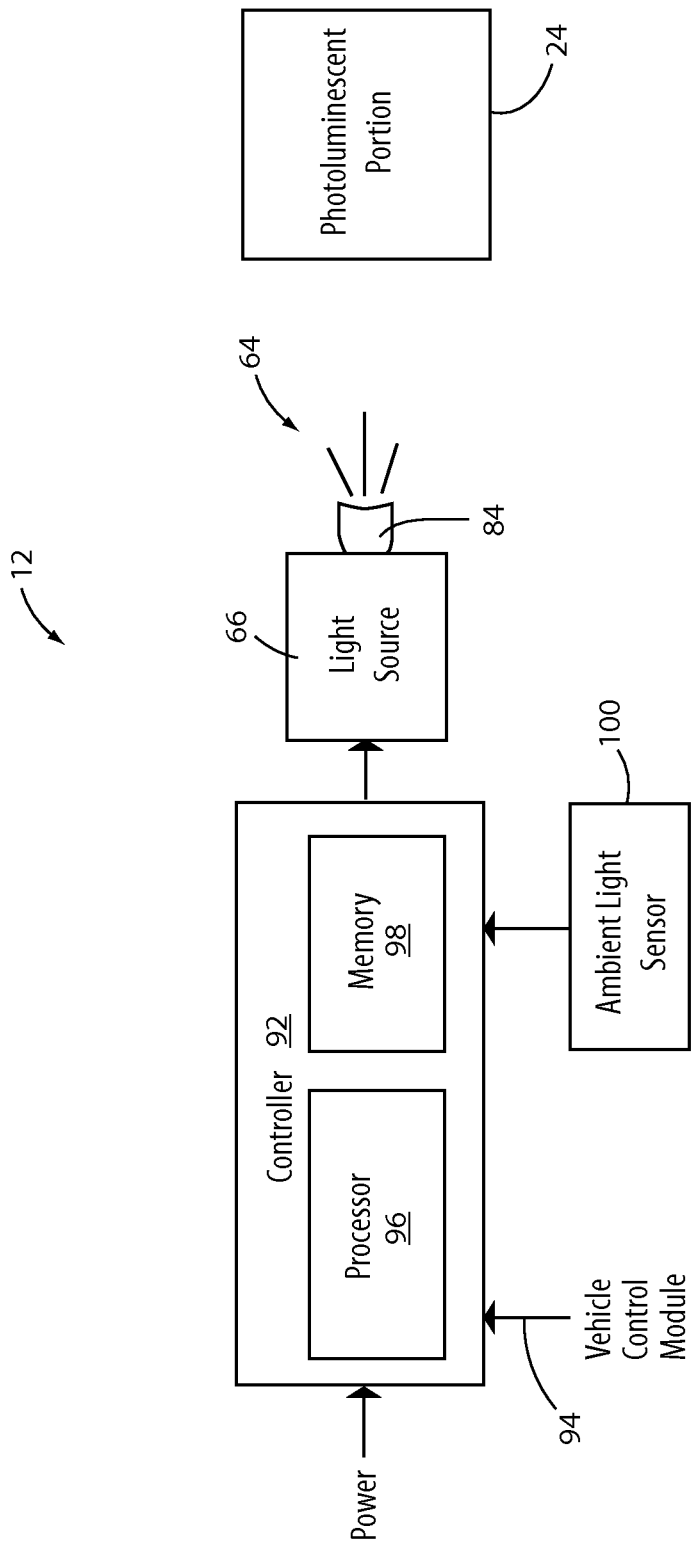
FIG. 7 is a block diagram of the lighting apparatus employing a controller configured to control the illumination.

Referring now to FIG. 7, a block diagram is provided of the lighting apparatus 12 demonstrating a controller 92 configured to control the illumination of the light source 66 to illuminate the photoluminescent portion 24. The controller 92 may be in communication with a communication bus 94 of the vehicle. The communication bus 94 may be configured to deliver signals to the controller 92 identifying various vehicle states. For example, the communication bus 94 may be configured to communicate to the controller 92 a drive selection of the vehicle, a door open state, an ambient lighting level, a fuel level, or any other information or control signals that may be utilized to adjust the illumination of the lighting apparatus 12. In this way, the controller 92 may selectively activate the light source 66 in response to one or more states of the vehicle 8.

The controller 92 may include a processor 96 comprising one or more circuits configured to receive the signals from the communication bus 94 and output signals to control the light source 66 to emit the excitation emission 64. The processor 96 may be in communication with a memory 98 configured to store instructions to control the activation of the light source 66. The controller 92 may further be in communication with an ambient light sensor 100. The ambient light sensor 100 may be operable to communicate a light condition, for example a level brightness or intensity of the ambient light proximate the vehicle. In response to the level of the ambient light, the controller 92 may be configured to adjust a light intensity output from the light source 66. The intensity of the light output from the light source 66 may be adjusted by controlling a duty cycle, current, or voltage supplied to the light source 66.

The controller 92 may be configured to selectively activate and/or deactivate the light source 66 in response to various vehicle states. Vehicle states may include but are not limited to: a drive selection of the vehicle 8, a door open state, an ambient lighting level, a fuel level, or any other information or control signals, for example a turn indication or a blind spot indication. In this configuration, the controller 92 may selectively activate the light source 66 to illuminate the running board 28 based on an environmental lighting, a moving or parked status, and various additional conditions that may relate to operation of the vehicle 8 and its environment. The controller 92 may further be configured to deactivate the light source 66 in response to a change in the conditions that lead to the activation and/or in response to a lapse of a predetermined time.

The lighting apparatus 12 described herein may provide for effective and affordable lighting to illuminate a step portion of a vehicle. The lighting apparatus 12 may be configured to emit utility light and/or decorative lighting from any of a plurality of the photoluminescent portions to meet a desired lighting effect. Though the apparatus disclosed herein is described in detail in reference to a running board or step portion of a vehicle, those skilled in the art will acknowledge that the disclosure may be applied to in a variety of implementations without departing from the spirit of the disclosure.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue. It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle illumination apparatus comprising:
   a light source disposed on a step portion;
   a first coating layer molded over the step portion and the light source; and
   a photoluminescent portion disposed proximate a tread portion of the step portion, wherein the tread portion corresponds to a second molded layer of a second polymeric material, wherein the light source is configured to emit a first emission to excite the photoluminescent portion to emit a second emission.

2. The illumination apparatus according to claim 1, wherein the first coating corresponds to a first molded layer of a first polymeric material.

3. The illumination apparatus according to claim 2, wherein the first polymeric material corresponds to a significantly transparent material operable to transmit the first emission therethrough.

4. The illumination apparatus according to claim 3, wherein the second polymeric material corresponds to a significantly opaque material operable to substantially block a transmission of the first emission.

5. The illumination apparatus according to claim 4, wherein the second polymeric material is applied to the first polymeric material and configured to mask at least one portion of an outer surface of the first polymeric material such that a light energy corresponding to the first emission is transmitted through an unmasked portion of the first polymeric material.

6. The illumination apparatus according to claim 5, wherein the photoluminescent portion is disposed proximate the unmasked portion and configured to receive the first emission.

7. The illumination apparatus according to claim 1, wherein the step portion corresponds to a running board of the vehicle.

8. An illuminated running board comprising:
   a light source disposed on a step portion;
   a first coating layer applied over the step portion and the light source;
   a second coating disposed over the first coating, wherein the second coating is applied to the first coating such that light energy corresponding to a first emission passes through at least one unmasked portion of the second coating to illuminate an outer surface of the second coating.

9. The illuminated running board according to claim 8, wherein the second coating corresponds to a tread portion of the step portion.

10. The illuminated running board according to claim 9, further comprising a photoluminescent portion disposed proximate the tread portion.

11. The illuminated running board according to claim 10, wherein the photoluminescent portion is disposed in at least a portion of the first coating layer such that the photoluminescent material is illuminated in a back-lit configuration.

12. The illuminated running board according to claim 10, wherein the photoluminescent portion is configured to receive the first emission and emit a second emission.

13. The illuminated running board according to claim 12, wherein the second emission corresponds to a different color of light than the first emission.

14. An illuminated running board comprising:
- a light source configured to output a first emission and disposed on a step portion;
- a first coating layer applied over the step portion and the light source;
- a second coating selectively applied over the first coating to mask at least a portion of an outer surface of the first coating; and
- a photoluminescent portion disposed proximate an unmasked portion of the first coating, wherein the first emission passes through the unmasked portion to illuminate an outer surface of the second coating.

15. The illuminated running board according to claim 14, wherein the photoluminescent portion is disposed on the outer surface of the second coating such that the portion of the outer surface corresponding to the photoluminescent portion is illuminated in a front lit configuration in response to receiving the first emission.

16. The illuminated running board according to claim 14, wherein the photoluminescent portion is configured to output a second emission in response to receiving the first emission.

17. The illuminated running board according to claim 16, wherein the second emission corresponds to a longer wavelength of light than the first emission.

18. The illuminated running board according to claim 14, wherein the second coating corresponds to a significantly opaque material configured to inhibit a passage of the first emission therethrough.

19. The illuminated running board according to claim 14, wherein the second coating corresponds to a tread portion of the running board.

* * * * *